No. 894,959. PATENTED AUG. 4, 1908.
A. KINGSBURY.
MACHINE FOR MAKING TISSUES OR FLIES AND ATTACHING THEM TO BOXES.
APPLICATION FILED APR. 29, 1905.

6 SHEETS—SHEET 1.

Witnesses:
Oscar F. Hill
Edith J. Anderson

Inventor:
Addison Kingsbury
by Chas. F. Randall
Attorney.

No. 894,959. PATENTED AUG. 4, 1908.
A. KINGSBURY.
MACHINE FOR MAKING TISSUES OR FLIES AND ATTACHING THEM TO BOXES.
APPLICATION FILED APR. 29, 1905.
6 SHEETS—SHEET 3.
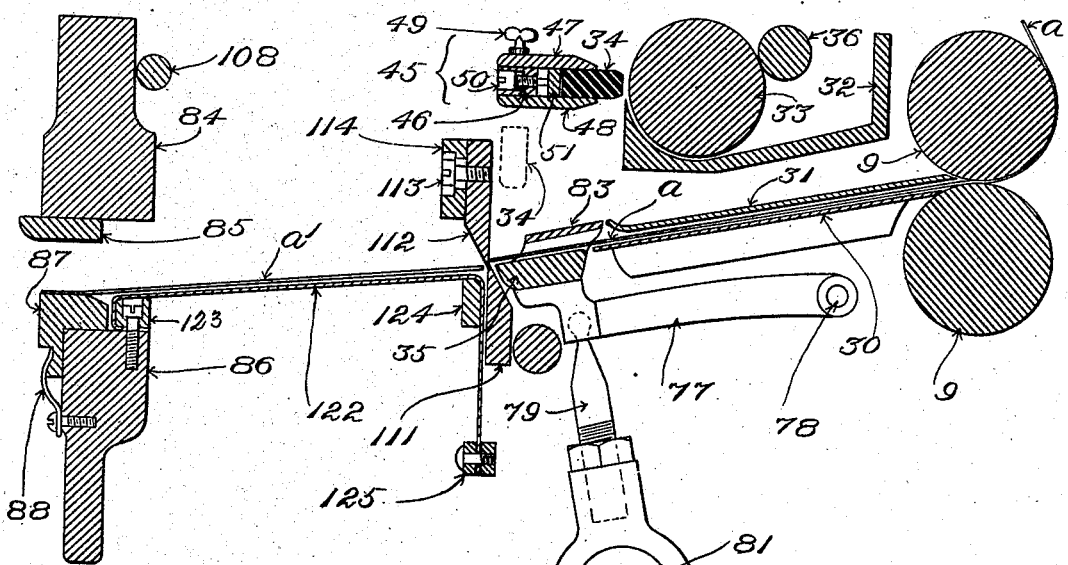
Fig. 3.
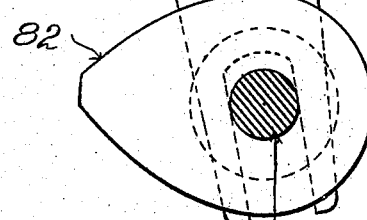
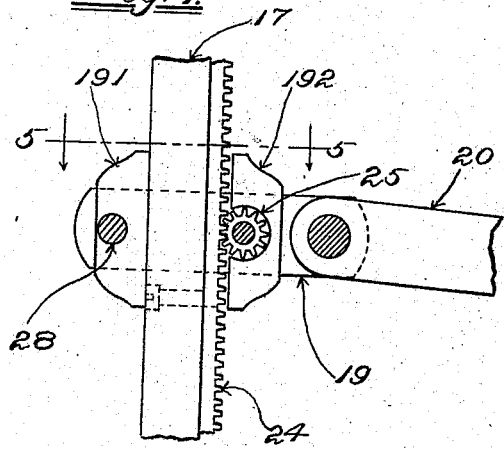
Fig. 4.
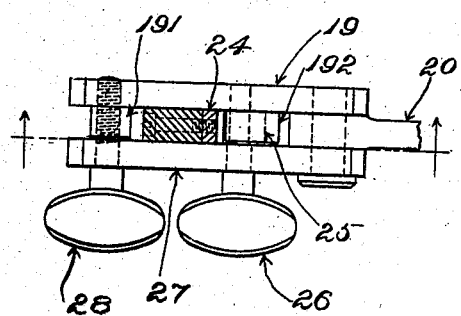
Fig. 5.
Witnesses:
Oscar F. Hill
Edith J. Anderson
Inventor:
Addison Kingsbury
by Chas. F. Randall
Attorney.

No. 894,959.
A. KINGSBURY.
MACHINE FOR MAKING TISSUES OR FLIES AND ATTACHING THEM TO BOXES.
APPLICATION FILED APR. 29, 1905.
PATENTED AUG. 4, 1908.
6 SHEETS—SHEET 4.
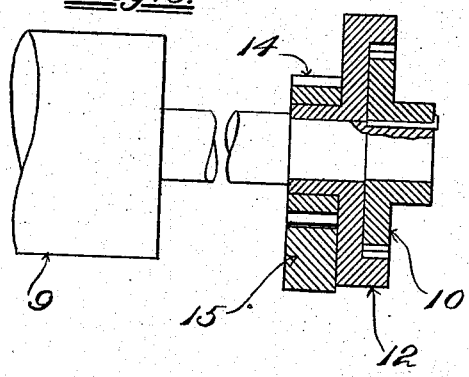
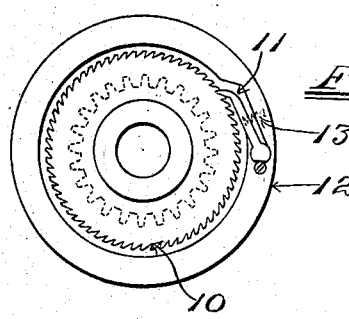
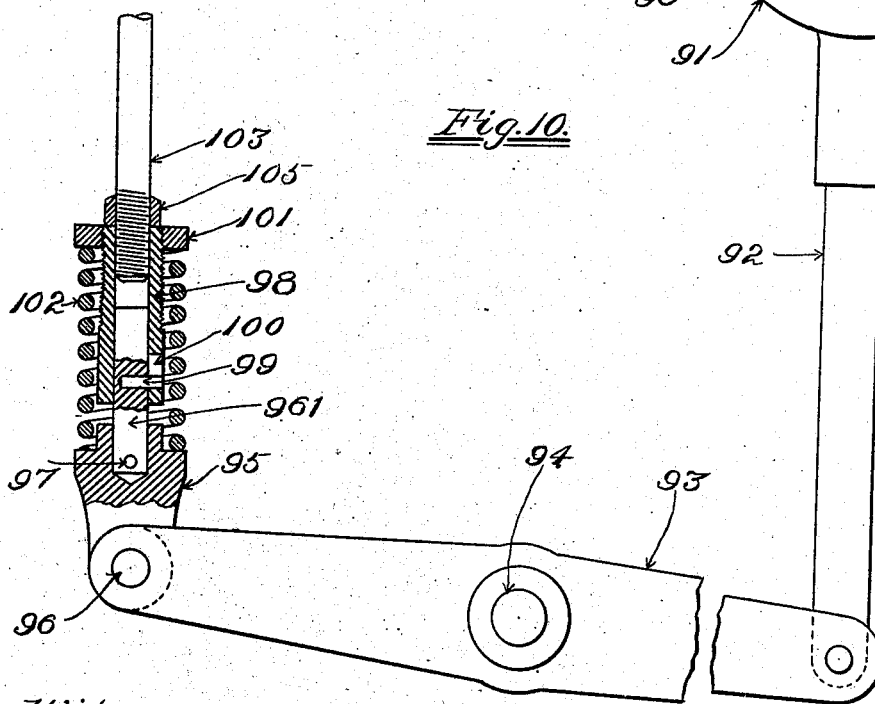
Witnesses:
Oscar F. Hill
Edith J. Anderson.
Inventor:
Addison Kingsbury
by Chas. F. Randall
Attorney

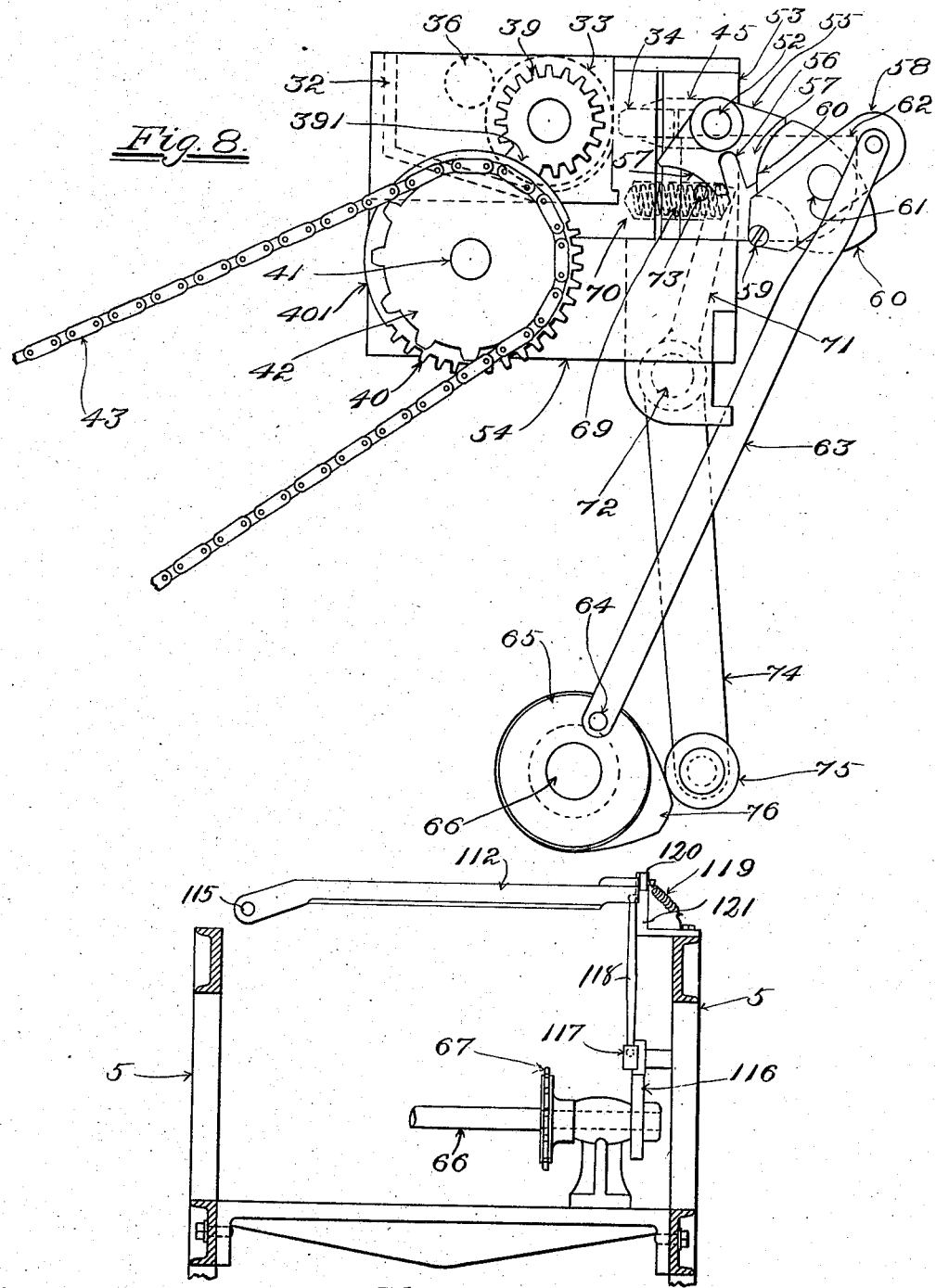

No. 894,959.

A. KINGSBURY.

PATENTED AUG. 4, 1908.

MACHINE FOR MAKING TISSUES OR FLIES AND ATTACHING THEM TO BOXES.

APPLICATION FILED APR. 29, 1905.

6 SHEETS—SHEET 6.

Witnesses:
Oscar F. Hill
Edith J. Anderson.

Inventor:
Addison Kingsbury
by Chas. F. Randall
Attorney.

UNITED STATES PATENT OFFICE.

ADDISON KINGSBURY, OF SOUTH COVENTRY, CONNECTICUT.

MACHINE FOR MAKING TISSUES OR FLIES AND ATTACHING THEM TO BOXES.

No. 894,959.  Specification of Letters Patent.  Patented Aug. 4, 1908.

Application filed April 29, 1905. Serial No. 258,018.

*To all whom it may concern:*

Be it known that I, ADDISON KINGSBURY, a citizen of the United States, residing at South Coventry, in the county of Tolland, State of Connecticut, have invented a certain new and useful Improvement in Machines for Making Tissues or Flies and Attaching Them to Boxes, &c., of which the following is a specification, reference being had therein to the accompanying drawings.

The invention consists in a novel machine for automatically making tissues or flies and attaching them to paper and other boxes, or other articles.

Figure 1:
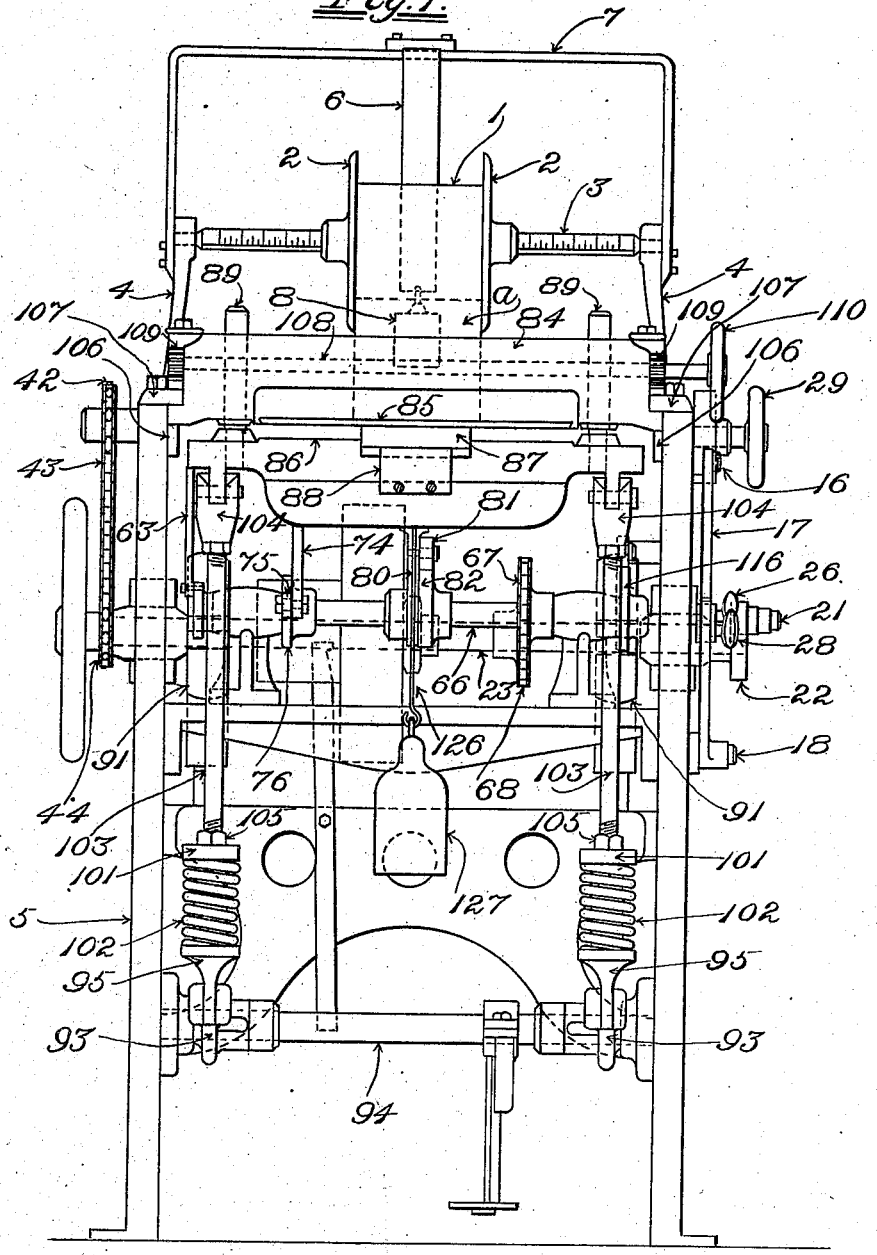
Figure 2:
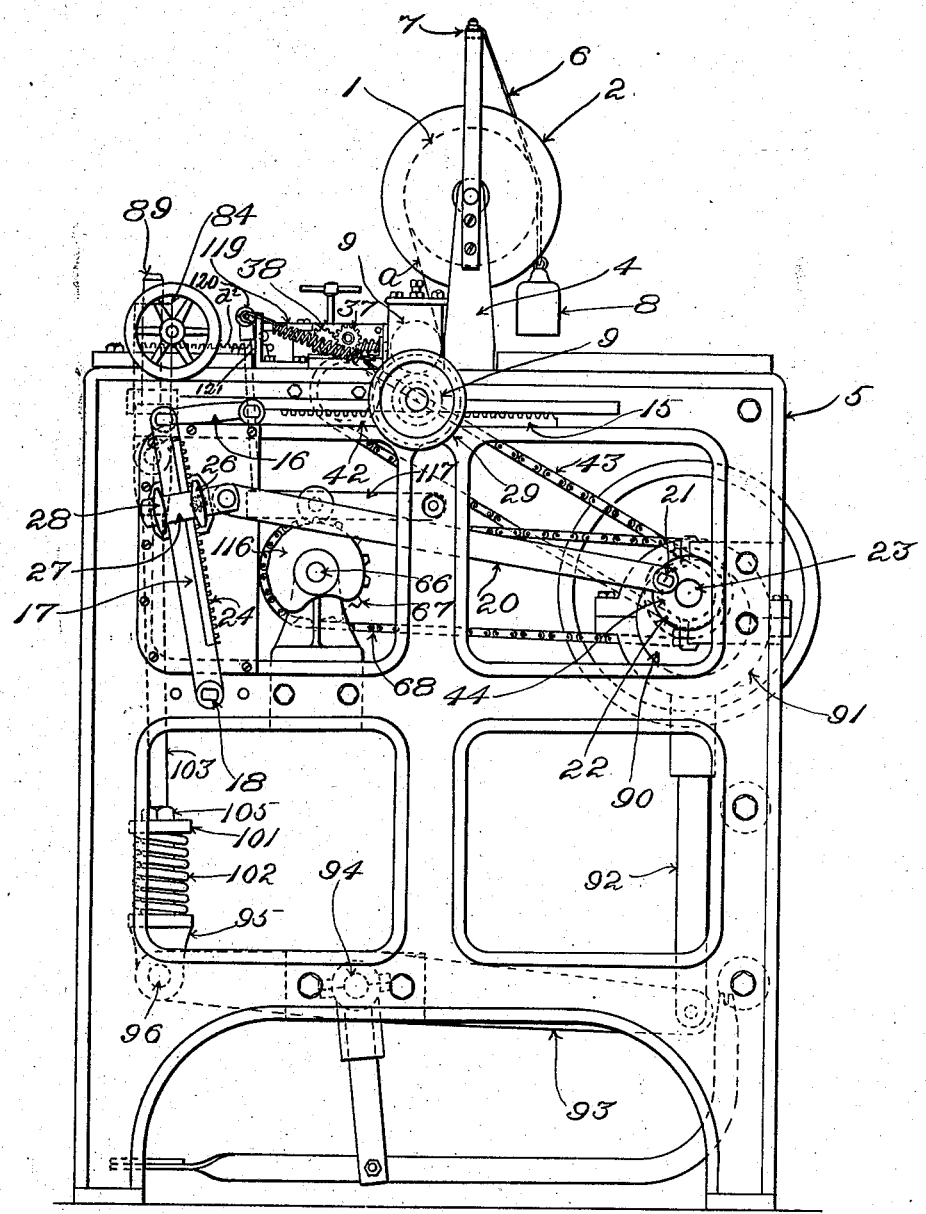
Figure 9:
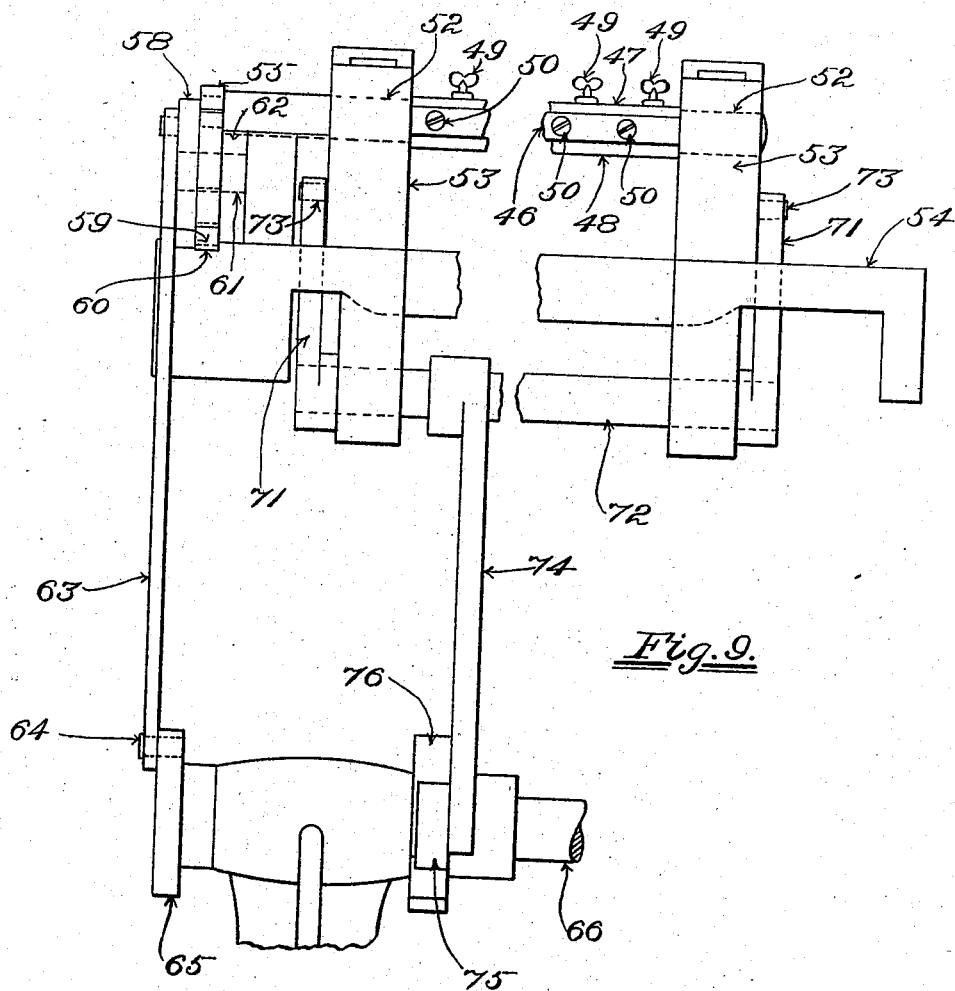

In the drawings,—Figure 1 is a view in end elevation of a machine embodying the invention. Fig. 2 is a side elevation of the said machine. Fig. 3, Sheet 3, is a sectional view showing the main working parts of the machine. Fig. 4, Sheet 3, is a detail view partly in side elevation and partly in section, showing portion of the web-feeding devices, and more particularly illustrating the means of adjusting the extent of feed. Fig. 5, Sheet 3, is a detail view partly in plan and partly in horizontal section, on the plane indicated by the dotted line 5, 5, in Fig. 4, illustrating the means of adjustment for the feed-mechanism. Fig. 6, Sheet 4, is a partly sectional detail of the ratchet-clutch driving devices for the lower feed-roll. Fig. 7, Sheet 4, is a view showing the said devices in side elevation. Fig. 8, Sheet 5, is a view showing chiefly the pasting devices in side elevation, looking at the side opposite that which is represented in Fig. 2. Fig. 9, Sheet 6, is a view of the devices which are shown in Fig. 8, looking at the same from the right-hand side in the latter figure. Fig. 10, Sheet 4, is a partly sectional detail view showing portion of the presser-actuating mechanism. Fig. 11, Sheet 5, is a sectional view of the upper part of the machine, showing chiefly the movable blade or knife of the cutter, and the actuating connections therefor.

In my invention the tissues or flies are produced from a continuous web of suitable material, usually paper, through the agency of automatic mechanism comprising a paster by which a transverse line of adhesive is applied to the leading portion of the web, feeding devices by which the web then is advanced so as to present the pasted portion of the same in position to be attached to a box or other article, a presser by which the said pasted portion then is pressed against the box or other article, and a cutter or shear by which the web is cut transversely to sever the tissue or fly from the same.

The continuous web *a*, Fig. 3, from which the tissues, flies, or the like, are made, is supplied from a wound roll of the same, as 1, Figs. 1 and 2, the said roll being mounted between heads 2, 2, upon a spindle 3, Fig. 1, which is journaled in supports 4, 4, rising from the upper portion of the main framework 5 of the machine. From the supply-roll 1 the web is drawn forward by the action of the feed-rolls. The unwinding of the web from the supply-roll is controlled by means of a drag-band 6 which makes contact with the periphery of the wound web, and one end of which is attached to a fixed overhead cross-bar 7 carried by the supports 4, 4, while the other end thereof has attached thereto a weight 8 operating to cause the drag-band to bear against the said periphery. By means of the said drag-band too free unwinding of the web, and overrunning in consequence of the intermittent action of the feeding mechanism, are obviated.

9, 9, Figs. 2 and 3, are a pair of feed-rolls, between which the web from the supply-roll passes. The said feed-rolls are rotated intermittingly, at each operation thereof turning sufficiently to advance the web a distance corresponding with the required length of a tissue or fly, or the like, and then remaining at rest during the operation of the paster, presser, and cutter or shear. For the purpose of causing the feed-rolls 9, 9, to be rotated to effect the feed of the web a ratchet-wheel 10, Figs. 6 and 7, Sheet 4, is fixed on one journal of the lower feed-roll. A pawl 11 is pivotally mounted upon a rotatable pawl-carrier 12 which is mounted upon the said journal with capacity to turn loosely thereon. The said pawl is held in engagement with the teeth of said ratchet-wheel by means of a spring 13. For the actuation of the pawl-carrier 12, a pinion 14 is connected therewith, the teeth of the said pinion being engaged by those of a rack 15, Figs. 2, 6 and 7, the said rack sliding on one side-frame of the machine and being joined by a link 16, Fig. 2, to a vibrating arm 17, Figs. 1 and 2, which at its lower extremity is pivoted by a pin 18 to the side-frame. The arm 17 has mounted thereon a connection-block 19, Figs. 4 and 5, Sheet 3, which is joined by a link 20, Fig. 1, to a crank-pin 21 on a disk 22 fast on one end of the main shaft 23 of the machine. When the said main shaft is rotated, movement is transmitted through the connections which have been described to the rack 15, and thereby the latter is reciprocated and thus caused to oscillate the pawl-carrier to effect the intermittent rotation of the feed-rolls through the agency of the pawl and ratchet devices.

For the purpose of enabling the extent of the feed-movement to be varied, so as to vary the length of paper that is advanced at each feed-movement, to thus give the length of fly that is desired, the connection-block 19 is made capable of shift or adjustment upon the arm 17 toward and from the center of movement thereof. To facilitate the making of the adjustment, the arm 17 is provided with a longitudinal rack 24, and the connection-block 19 is furnished with a pinion 25, Figs. 4 and 5, Sheet 3, engaging with the rack and having a thumb-spindle 26, Fig. 5, for convenience in turning the said pinion. By rotating the spindle and pinion the connection-block 19 may be moved along the arm 17. For the purpose of enabling the connection-block to be held in the position to which it is adjusted, it is provided with a face-plate or cap-plate 27 and clamping-screw 28. The body of the connection-block is placed at one side of the arm 17, as in Figs. 4 and 5, and the face-plate at the other side thereof, and by means of the clamping-screw 28 the said body and face-plate may be drawn toward each other so as to cause them to press firmly against opposite sides of the arm and thereby clamp the connection-block securely in the desired place upon the arm. To permit the connection-block to be adjusted, the clamping-screw is turned so as to release the hold of the clamp upon the arm. After the adjustment has been effected, the said screw is tightened again. The body of the connection-block is formed or provided with guide-pieces 191, 192, extending transversely therefrom at front and rear, respectively, of the arm 17, for engagement with the front edge of the said arm, and with the teeth of the rack at the rear edge thereof, respectively. The guide-piece 192 is formed with a recess, as shown in Fig. 4, Sheet 3, which receives the adjusting pinion 25. For convenience in turning the lower feed-roll by hand for the purpose of threading the web through whenever desired, or for advancing the web if necessary at any time, the lower feed-roll is provided with a hand-wheel 29, Figs. 1 and 2.

From the feed-rolls the web passes forward upon a supporting guide-plate or table 30, Fig. 3, Sheet 3, above which is an upper guide-plate 31, by which the web is held from rising from the said supporting guide-plate or table. The supporting guide-plate or table sustains the portion of the web which extends from the feed-rolls to the paster and cutter or shear.

The paster, as shown best in Fig. 3, Sheet 3, comprises, essentially, a paste-trough 32, a paste-roll 33, a paste-applying strip 34, and a press-bar 35. The paste-roll 33 is partly received within the paste-trough 32, so that a portion thereof will be immersed in the adhesive which is contained in the said paste-trough. A spreader-roll 36 works against the periphery of the paste-roll 33, the two rolls being geared together by spur-gears 37, 38, Fig. 2, in order that when the paste-roll is rotated the spreader-roll may be caused to turn in unison therewith. By driving the spreader-roll positively from the paste-roll the spreader-roll is prevented from sticking and acting to scrape the adhesive from the surface of the paste-roll, so as to render the coating of adhesive upon the paste-roll deficient in thickness, or lacking in uniformity, as might happen occasionally if the spreader-roll should be driven by the frictional contact of its surface with that of the paste-roll. The paste-roll is caused to rotate by driving mechanism shown in Figs. 1 and 2, and Fig. 8 of Sheet 5. The said driving mechanism embraces a spur-pinion 39 which is fast on one journal of the paste-roll 33, and a toothed driver 40 which is mounted to turn upon a fixed supporting stud 41 and is rotated through connections with the driving-shaft 23, the said connections comprising a sprocket-wheel 42, fast with the said driver, a sprocket-chain 43, and a sprocket-wheel 44 on the said driving-shaft. The paste-roll, and incidentally the spreader-roll, are rotated intermittingly, in order that the paste-roll may stand at rest at the time at which the paste-applying strip 34 makes contact with the same for the purpose of receiving adhesive material therefrom. To secure the intermittent rotation of the paste-roll, the continuously rotating driver 40 is furnished with a segmental series of teeth extending only part way around the periphery thereof, as shown clearly in Fig. 8, the remainder of the said periphery being constituted of the convex stop-segment 401, and pinion 39 is formed with a segmental series of teeth corresponding in number with those of driver 40 and adapted to be engaged thereby for the purpose of turning the paste-roll, and with a concave stop-segment for coöperation with the convex stop-segment 401 of the driver, to hold the paste-roll at rest after the said segmental series of teeth of the driver has run out of mesh with the teeth of the paste-roll and until the said series again enters into mesh with the teeth of the paste-roll.

The paste-applying strip 34 is held by a carrier 45, Fig. 3, Sheet 3, and Fig. 8, Sheet 5, the said carrier comprising, essentially, a body-bar 46 and opposite side-bars 47, 48, receiving the said strip 34 between them at one edge of the body-bar. The acting edge of the strip 34 projects somewhat beyond the edges of the side-bars, to enable it to make contact with the surface of the paste-roll and also with that of the material of which the tissue or fly is formed. The side-bar 47, which may be termed the front-piece of the carrier, is removably attached to the body-bar, as by means of thumb-screws 49, 49, in order to enable it to be detached, when desired, to permit inspection or change of the paste-applying strip. The said strip is composed of rubber, or other material suitable for the purposes of the strip, and corresponds in length with the width of the web $a$. The width of the web will correspond with the size of the boxes which are to be provided with tissues or flies.

To suit a different size of boxes, the strip 34 will be replaced by another of a length corresponding with the width of web that is used for such size. The strip 34 is provided with means of adjustment by which to vary the extent of the projection of its working edge beyond the edges of the side-bars 47, 48, and to enable the said working edge to be set as may be necessary at different points in the direction of its length to cause it to make perfect contact with the paste-roll 33. The said means of adjustment consists of a series of adjusting-screws 50, 50, Fig. 3, Sheet 3, and Fig. 9, Sheet 6, which have the threaded stems thereof fitted to threaded holes which are tapped through the body-bar 46, the inner ends of the said adjusting-screws making contact with a strip or pieces 51, Fig. 3, of wood or other material suitable to withstand the pressure and wear, interposed between the said inner ends and the paste-applying strip 34.

The carrier of the paste-applying strip is mounted movably so as to enable it to be operated to swing the said strip upward into the position which is shown in full lines in Fig. 3, in readiness to make contact with the adhesive-covered surface of the paste-roll to receive a charge of adhesive from the said surface, and downward from the said full-line position into the dotted-line position of the same figure, for presentation to the web $a$ for the purpose of transferring the adhesive to the surface of the said web. To provide for these movements of the carrier, the latter is furnished with journals 52, 52, Figs. 8 and 9, which are fitted to bearings in blocks 53, 53, that are mounted upon the table 54 supporting the paste-trough 32 and constituting portion of the frame-work of the machine. The carrier is moved from one of the foregoing positions into the other thereof, and vice versa, by rocking it upon the said journals, and this is effected through the coöperation of a segmental plate 55 which is attached to one of the journals and formed with a radial slot 56 and locking concavities 57, 57, located on opposite sides of the said slot, and the rocker 58 having the pin or roll 59 to work in the said slot and the locking convexities 60, 60, at opposite sides of said pin or roll to enter, respectively, the said locking concavities 57, 57, in the respective working positions of the parts. The rocker 58 is mounted upon a pivotal support 61 on a fixed wing 62 which forms portion of or is connected with the adjacent bearing block 53.

For the purpose of causing the carrier to be turned from one position thereof to the other, the rocker is oscillated by means of actuating devices comprising a link 63 connecting the same with a crank-pin 64 that is carried by a disk 65 fast upon an intermediate or secondary shaft 66, the said shaft being driven from the main shaft 23 by means of a sprocket-wheel 67, Figs. 1 and 2, fast upon the same, a sprocket-chain 68, and a like sprocket-wheel fast upon the shaft 23.

In the working of the machine, the paste-applying strip 34 swings upward from its dotted-line position in Fig. 3 into its full-line position in Figs. 3 and 8, clear of the periphery of the paste-roll. The said strip is then pressed against the said periphery to receive a charge of adhesive and then is withdrawn from the paste-roll preliminary to being swung down from the full-line position to the dotted-line position. The movement of the strip toward and away from the paste-roll is effected by mounting the blocks 53, 53, upon the table 54 with freedom to slide thereon in such directions. Normally, the said blocks are held in forward positions at the greatest distance from the paste-roll by means of expanding spiral springs 69, Fig. 8, occupying sockets in the blocks and in fixed uprights 70 rising from the table 54. The movement of the strip 34 toward the paste-roll is produced by moving the blocks 53, 53, in such direction against the resistance of springs 69, compressing the latter. This movement is provided for by means of upwardly-extending arms 71, 71, that are fast upon a transversely-extending rockshaft 72, Figs. 8 and 9, which is journaled in downwardly extending projections from table 54, the said arms engaging with pins 73, 73, or other projections from the blocks 53, 53, and the said rockshaft being provided with a downwardly extending arm 74 carrying a roll 75 which makes contact with a cam 76 upon the secondary shaft 66. Through the action of the cam against the said roll, the rockshaft is turned in the proper direction to cause the supporting devices of the paste-applying strip to advance toward the paste-roll. By means of the springs 69, the said supporting devices are moved to cause them to recede from the paste-roll.

When the paste-applying strip 34 is presented in its dotted-line position of Fig. 3 in readiness for transferring adhesive to the web a, the said strip occupies a position above the normal path of the web, as in said figure. For the purpose of causing the leading portion of the web to make contact with the adhesive-coated acting surface of the strip, the press-bar 35 is employed. The paster and the said press-bar are located at the supply side of the cutter or shear. The press-bar normally occupies a position below the path of the web, and may serve to support and guide the leading end of the web in advance of the guide-plate or table 30. To permit movement of the press-bar for the purpose of causing the web to be carried against the paste-applying strip, the press-bar is supported upon arms 77, Fig. 3, which are pivotally hung, as at 78, adjacent the lower feed-roll. It is operated from the secondary shaft 66 by means of a ball-headed post 79 projecting upward from a yoke 80 provided with a roll 81 working against the periphery of a cam 82 upon the secondary shaft. The ball-head of the said post works within a socket at the underside of the press-bar. In the rising movement of the press-bar, the latter raises the web against the forward portion of the upper guide-plate 31, bending the web around the edge of the said upper guide-plate. In this movement of the press-bar and of the web therewith, the said forward portion of the upper guide-plate acts as a hold-back, causing the web to draw back over the ascending press-bar so that only the extreme leading portion of the web shall be presented to the paste-applying strip in position to receive the adhesive. For the purpose of pulling the web away from the acting face of the paste-applying strip 34 as the press-bar descends, a stripper 83 is carried by the press-bar. The said stripper consists of a bar or plate that is supported above the rear portion of the press-bar so that the web may travel freely between them.

The presser by which the tissue or fly is attached to a box or other article comprises, essentially, a fixed upper pressing-member or head 84 having a facing-strip 85 which is detachably applied thereto in order to enable the same to be removed for being cleaned, etc., and subsequently replaced, a movable lower pressing-member or bed 86 having detachably applied to it a form 87 of a length suited to the box to be operated upon, and means for moving the said lower pressing-member or bed toward and from the fixed upper pressing-member or head. The form 87 is removably secured to the lower pressing-member or bed by means of a spring-catch or clip 88, Figs. 1 and 3, permitting it conveniently to be detached and replaced by another of different length to suit a change in the size of the boxes or other articles to which tissues or flies are to be attached. The said lower pressing-member or bed is guided with relation to the upper pressing-member or head, in its movements toward and from the latter, by means of pins 89, 89, Figs. 1 and 2, which are fixed to the lower pressing-member or bed and pass upward through holes in the upper member or head, which holes they fit. For the purpose of operating the lower pressing-member or head, eccentrics 90, Fig. 2 and Fig. 10 of Sheet 4, are fixed upon the main shaft 23, each of the said eccentrics having applied thereto a strap 91 which is provided with a connecting-rod 92 having the lower extremity thereof pivotally joined to the rear arm of a lever 93 which is mounted upon a supporting rod or shaft 94 extending transversely across the framework of the machine.

The forward arms of the respective levers are operatively joined with the lower pressing-member or bed through connections by means of which movement is transmitted from the said levers to the said lower pressing member or bed. The said connections transmit a yielding force to the latter, and are constructed as follows: A connecting-piece or coupling 95, Figs. 1 and 2, and Fig. 10, Sheet 4, is pivotally joined at 96 to the free extremity of the forward arm of a lever 93. One end of a short section of connecting-rod 961 is seated in a socket in the said connecting-piece or coupling, and is secured therein by a pin 97, Fig. 10. Upon the projecting portion of the said section 96 a sleeve 98 is mounted, the said sleeve being fitted to the section 96 so as to slide upon the latter, the sleeve being held from turning and the extent of the sliding movement being determined by a stop-pin 99 fixed in the section 96 and projecting therefrom, the sleeve being slotted longitudinally at 100 to receive the projecting portion of the said stop-pin. The sleeve is screw-threaded exteriorly for a portion of its length, and receives upon the threaded portion thereof an interiorly-threaded adjustable collar 101, the sleeve being encircled by an expanding spiral spring 102 which is confined between the said collar and a shoulder formed upon the connecting-piece or coupling 95. The sleeve is screw-threaded interiorly and receives the correspondingly-threaded lower portion of a rod 103, the upper portion of which is also screw-threaded and is entered into an internally-threaded socket within a connecting-piece or coupling 104 which is pivotally joined to a depending ear or lug of the lower pressing-member or table 86. The threads of the upper and lower portions of the rod 103 are respectively right and left, whereby, by turning the said rod the operative length of the connections intermediate the lever 93 and the lower pressing-member or bed may be adjusted. Lock-nuts 105, 105, are applied to the said screw-threads to prevent accidental loss of adjustment. By adjustment of the collar 101 the tension of the spring 102 is varied to regulate the degree of pressure that is transmitted through the lower compression-member or table to the box or other article and tissue or fly which are being united. The adjustment of rods 103, 103, is for convenience in setting-up, and also is an auxiliary means of adjusting the pressure of the springs 102, 102, by causing such pressure to take effect sooner or later in the movement of the parts.

For the purpose of enabling the distance between the paster and cutter or shear and the presser to be varied, for the production of different lengths of tissues or flies, the presser is made adjustable toward and from the paster and cutter or shear. Thus, the ends of the upper compression-member or head 84 are fitted to guides 106, 106, Fig. 1, upon the side-frame, upon which they are adapted to slide. The said ends are held down to the said guides by means of plates or gibs 107, 107, which are bolted upon the tops of the side-pieces of the machine-framing. For the purpose of effecting the adjustment conveniently, racks $d^2$, $d^2$, are provided upon the plates or gibs aforesaid, and upon the upper compression-member or head is mounted a cross-shaft 108 which is provided with pinions 109, 109, gearing into the said racks, the said cross-shaft having a hand-wheel 110 by means of which the shaft 108 may be turned manually to shift the presser.

The cutter or shear comprises a fixed blade 111, Fig. 3 of Sheet 3, and Fig. 11 of Sheet 5, and a movable blade 112 which coacts with the said fixed blade. The movable blade 112 is attached by screws 113, 113, to a carrying lever 114, which latter is supported at one extremity thereof upon a pivot 115 Fig. 11, which is located at one side of the machine. The said movable blade is operated by devices at the opposite side of the machine, comprising a cam 116 upon the secondary shaft 66, a lever 117 carrying a roll which makes contact with the surface of the said cam, and a rod 118 extending from the cam-actuated lever 117 to the knife-carrying lever 114. For the purpose of holding the edge of the moving blade 112 pressed against the edge of the fixed blade 111 to insure a clean cut, a contracting spiral spring 119 having one extremity thereof attached to a fixed point upon the machine-framing has the other extremity thereof engaged with the free extremity of the knife-carrying lever. A truck or roll 120 is also mounted upon the said extremity of the said lever, and is kept pressed by the action of the said spring 119 against the vertical guide-face of a stand 121 which is fixed upon the adjacent side-framing of the machine. The said stand is adjustable upon the said side-framing in the direction from front to rear. The purpose of the spring and guide-stand is to enable the cutting edges of the knives to be caused to make an exact and perfect contact with each other.

For the support of the leading portion of the web $a$ as the same, after having had adhesive applied thereto, is fed forward from the paster and cutter or shear to the presser, into place at the latter for attachment to a box or other article held in position to receive the same, and of the severed tissue or fly $a'$, Fig. 3, a flexible apron 122, Fig. 3, is employed. In order that the said apron may be caused to adjust itself to accommodate different distances between the presser and the paster and cutter, the said apron has the forward end thereof secured by a fixed clamp 123 to the lower compression-member or bed 86, the apron extending from the latter to and over a supporting-bar 124 which is arranged closely alongside the fixed knife 111. The rear end of the apron hangs down between the supporting-bar and the said knife, and has applied thereto a movable clamp 125, from which last is hung by a wire or other suspensory device 126 a weight 127. When the presser is adjusted toward or from the paster and cutter, the apron slides over the supporting-bar 124, it being held taut by the weight 127 at all times.

The machine is provided with driving devices, embracing start-and-stop mechanism under control of the operator. The said mechanism ordinarily will be arranged to enable the operator to cause the machine to operate to apply a tissue or fly to a box and then stop the machine automatically, although the machine may be properly speeded to suit the operator and be kept in continuous operation under the control of the operator.

I claim as my invention:—

1. In a fly-machine, the combination with a presser, a cutter, and a paster acting at the supply-side of the cutter, of feeding devices acting to feed the adhesive portion of the web and the desired unpasted length of web for a fly past the cutting point into position for being attached by the presser.

2. In a fly-machine, the combination with a presser, a cutter, a paster acting at the supply-side of the cutter, and web-feeding devices acting to feed the adhesive portion of the web and the desired unpasted length of web for a fly past the cutting point into position for being attached by the adhesive leading end by the presser, of means to adjust the distance between the presser and the cutter and paster to vary the length of fly.

3. In a fly-machine, the combination with a presser, a cutter, and web-feeding devices, of a paste-applying device, a presser-bar by which the web is carried into position to receive adhesive material from the said paste-applying device, and operating means for the press-bar.

4. In a fly-machine, the combination with a presser, a cutter, and a paste-applying device, of a press-bar, actuating means for the said press-bar whereby the latter is moved to cause the web to make contact with the paste-applying device to receive adhesive material therefrom, and web-feeding devices whereby the adhesive portion of the web is advanced into position for being attached by the presser.

5. In a fly-machine, the combination with a presser, a cutter, and a paste-applying device, of a press-bar, means for moving the said presser-bar to carry the leading end of the web into contact with the paste-applying device to receive adhesive material therefrom, a hold-back for the web acting, as the web is moved by the presser-bar, to draw back the said leading end into position for receiving the said adhesive material, and web-feeding devices whereby the adhesive portion of the web is advanced into position for being attached by the presser.

6. In a fly-machine, the combination with a presser, and a cutter, of a paste-applying device, a paste-supplying roll, means to turn the said paste-applying device to present the same alternately to the said roll and to the web of fly-material, means to produce relative movement of the said device and roll to transfer adhesive from the latter to the former, a presser, means to operate said presser to carry the fly-material against the paste-applying device to receive adhesive material therefrom, and web-feeding devices.

7. In a fly-machine, the combination with web-feeding devices, a cutter, and a paster operating to apply paste to the web intermittingly at the supply-side of the cutter, to render the leading end thereof adhesive, of a presser, and means to adjust the presser toward and from the said cutter and paster to vary the length of fly.

8. In a fly-machine, the combination with web-feeding devices, a paster at the feeding side of the cutter, and a cutter, of a presser, means to adjust the distance between the presser and the cutter and paster to vary the length of fly, and a self-adjusting support sustaining and guiding the web and fly intermediate the cutter and paster and the presser.

9. In a fly-machine, the combination with a presser, a cutter, and a paster acting at the supply-side of the cutter, of means to adjust the distance between the presser and the cutter and paster to produce the required length of fly, of web-feeding devices adjustable to secure correspondence of the length fed forward for a fly with the said distance.

10. In a fly-machine, the combination with a presser, a cutter, and a paster acting at the supply-side of the cutter, of means to adjust the distance between the presser and the cutter and paster to produce the required length of fly, web-feeding rolls, an arm in operating connection with said rolls, means to vibrate said arm to rotate the rolls intermittingly, operating devices for said arm, and means to adjust the point of operative connection of said devices with said arm toward and from the pivotal axis of the latter.

11. In a fly-machine, the combination with a presser, of a cutter, web-feeding devices acting to advance the leading end of the web by a single feeding movement from the place at which the cutter acts into the final position for attachment by the presser, and means to apply paste to the said leading end prior to such feeding movement.

12. In a fly-machine, in combination, the presser, the cutter, a paste-roll, a swinging paster, a reciprocating carrier for said paster, and operating means for said carrier and paster by which the paster is moved to receive paste from the paste-roll and then actuated to transfer the paste to the web at the supply side of the cutter.

13. The combination with the cutter, and the paster, of the upper presser-head, the lower presser-head, means for producing relative movement of one presser-head toward and from the other, fixed guides on which the pressing devices are mounted, and rack and pinion devices for adjusting the pressing devices upon the said fixed guides toward and from the cutter.

14. The combination with the cutting and pasting devices, of the upper and lower press-members movable relatively toward and from each other, pins carried by one of said press-members and engaging with the other thereof to maintain the press-members in register with each other, fixed guides on which one of said press-members is mounted, and means to adjust the press-members lengthwise of the fixed guides to vary the distance between the same and the cutter.

In testimony whereof I affix my signature in presence of two witnesses.

ADDISON KINGSBURY.

Witnesses:
   J. E. STANLEY,
   JAMES S. MORGAN.